Dec. 29, 1925.

R. L. WILCOX

TRIMMING MECHANISM

Filed August 9, 1924   5 Sheets-Sheet 4

INVENTOR
Richard Lester Wilcox
BY
ATTORNEY

Patented Dec. 29, 1925.

1,568,032

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

TRIMMING MECHANISM.

Application filed August 9, 1924. Serial No. 731,153.

*To all whom it may concern:*

Be it known that I, RICHARD LESTER WILCOX, a citizen of the United States, residing at Waterbury, in the county of New Haven and State of Connecticut, have invented certain new and useful Improvements in Trimming Mechanism, of which the following is a specification, reference being had therein to the accompanying drawings.

My invention relates to improvements in trimming mechanism, referring more particularly to devices of this character for trimming the heads of bolts, blanks, screws and the like.

It is the object of this invention, among other things, to provide such a device wherein the feed and transfer mechanisms may be adjusted relatively to the punch and die means as a unit and the mechanism for operating the same will automatically accommodate itself to these adjusted positions; to actuate the transfer mechanism so that it may discontinue its movements without disarranging any of its operative parts in case the same should meet with an obstacle or anything should interfere with the movement thereof; and accomplish these, and other desirable objects by parts that may be readily associated with a standard type of machine.

To these, and other ends, my invention consists in the trimming mechanism, having certain details of construction and combinations of parts, as will be hereinafter described and more particularly pointed out in the claims.

Referring to the drawings, in which like numerals of reference designate like parts in the several figures.

In machines for trimming heads of bolts, blanks, screws and the like, the blank is delivered to a station either manually or automatically, from which it is carried and presented to the punch and die with its axis substantially coincident therewith and then forced into the die by the punch for the trimming operation, being thereafter passed either entirely through the die in the same direction as the cut or rejected from the die in the opposite direction.

Unless the machine is made for a single length blank, which is not the economical method, the parts must be adjusted to accommodate any length blank between the extreme limits accommodated by the machine. The punch being associated with the gate and actuated usually either from a crank or toggle, travels through a path with fixed limits, and hence is not adjustable. Such adjustments as are required are usually made in connection with the transfer mechanism and the feed mechanism. Heretofore these adjustments have necessitated the rearrangement of a number of parts relative to the punch and die. Such rearrangements are so complicated as to make the task of adjusting the machine for different length blanks one requiring considerable skill, as well as the loss of considerable time.

These, and other objections, to the old type of machine are obviated in my new and improved trimming mechanism. All of the parts requiring adjustment are so associated together as to be changed from one position to another as a unit and the connections between the operating parts and the source of power automatically adjust themselves to such new positions. Thus the labor necessary to adjust the machines for different length blanks requires the minimum skill and time. In addition to these, and other desirable features, embodied in my invention over the prior art, I have provided means to operate the transfer mechanism, whereby, if during any of its movements, whether traveling in a straight or circular path, it should meet an obstruction or its progress be interfered with, it will stop without injury or damage to any of its parts and will automatically continue its movement in timed relation with the other parts, when such obstruction or interfering object is removed.

In the drawings, I have illustrated my improved mechanism as applied to a trimming machine of the ordinary type, wherein 10 designates the body or frame of the machine, within which is rotatably mounted a crank shaft 11; and a reciprocating gate 12 connected with and actuated from the shaft 11 by the pitman 13. Fixed in this gate is a punch 15, having thereon a knockout rod 16.

Figure 7:
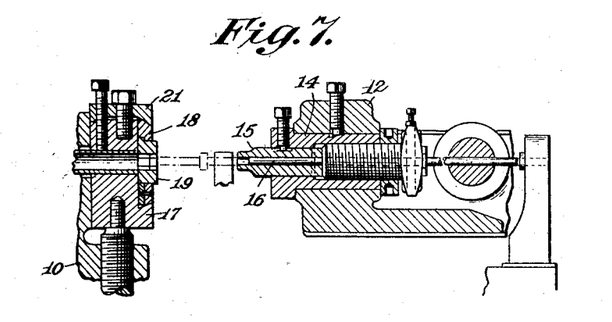
Figure 7 is a sectional elevation of a portion of the die and punch mechanism, taken generally upon line 7—7 of Figure 2.

Fixed in the body 10 is a die block 17, within which is transversely mounted a die holder 18 containing a die 19. This die holder is adjusted laterally by the screw 20 and held in its adjusted position by a clamp 21.

The mechanism above described is of a well known construction and type and is merely shown and described herein for the purpose of illustration. The punch and die mechanism, as shown herein, is of the type usually used where the blank, during the trimming operation, is passed entirely through the die. This detailed construction, of course, is only one of the numerous forms of such mechanism that may be used in connection with my improved mechanism.

Figures 8, 9:
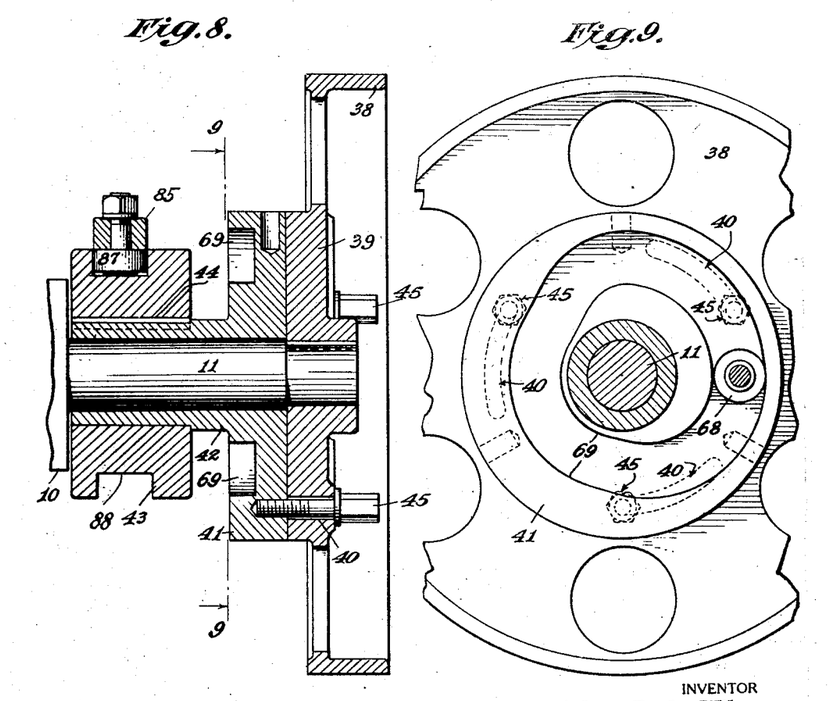
Figure 8 is an enlarged sectional view upon line 8—8 of Figure 2 of a portion of the cam mechanism.
Figure 9 is a fragmentary end view thereof, the parts in section being taken generally upon line 9—9 of Figure 8.

Secured to the shaft 11 is a pulley 38 having a flanged hub 39, through which are a plurality of segmental slots 40. Upon the shaft 11, between the pulley 38 and body 10, is the cam 41, upon the hub 42 of which is secured the cam 43 by the key 44 or the like. The cam 41 is secured to the hub 39 by the screws 45, one of which passes through each of the segmental slots 40 and are threaded therein so that the cams 41 and 43 may occupy different relative positions about the axis of the shaft for a purpose hereinafter described.

Figure 1:
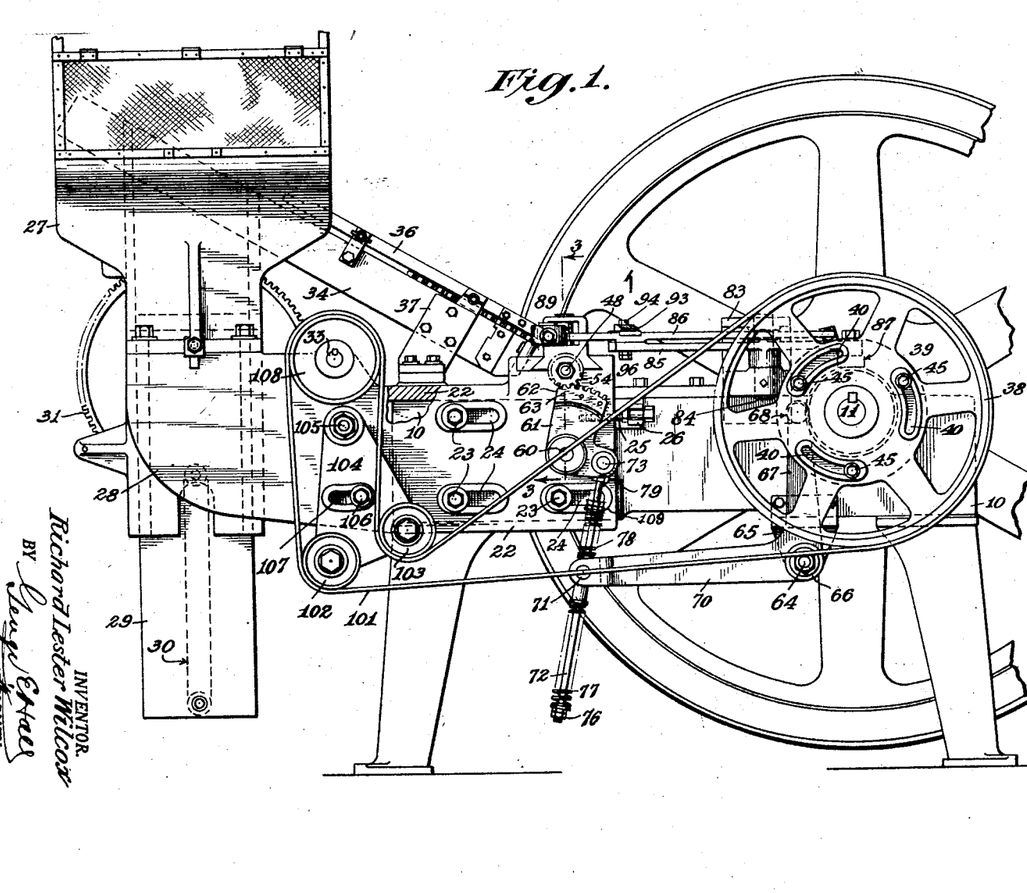
Figure 1 is a side elevation of a machine having my new and useful improvements connected therewith.
Figure 2:
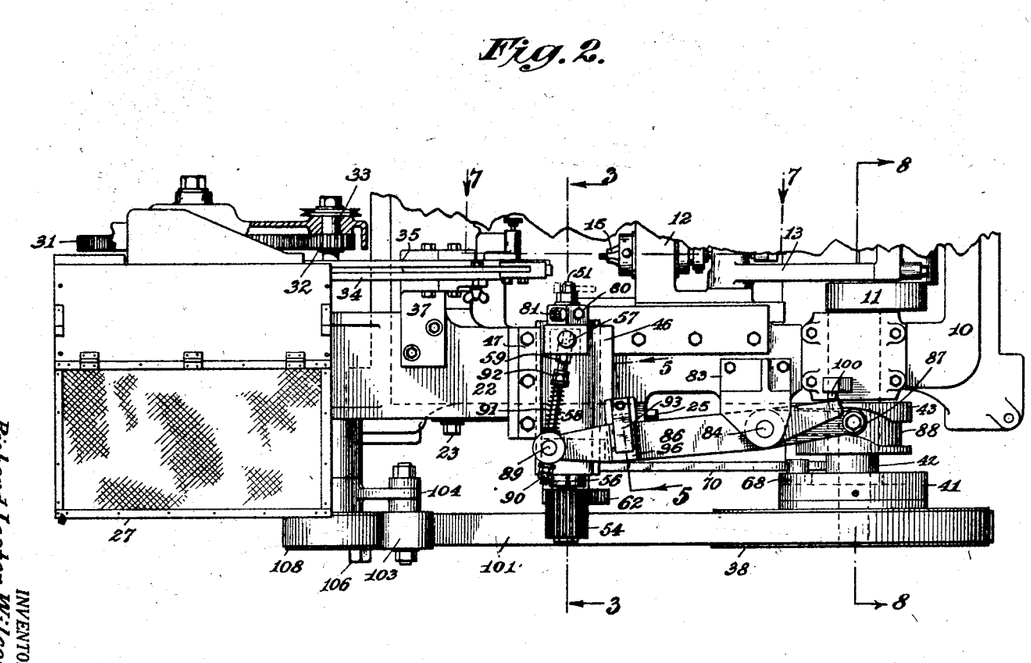
Figure 2 is a fragmentary plan view thereof.
Figure 6:
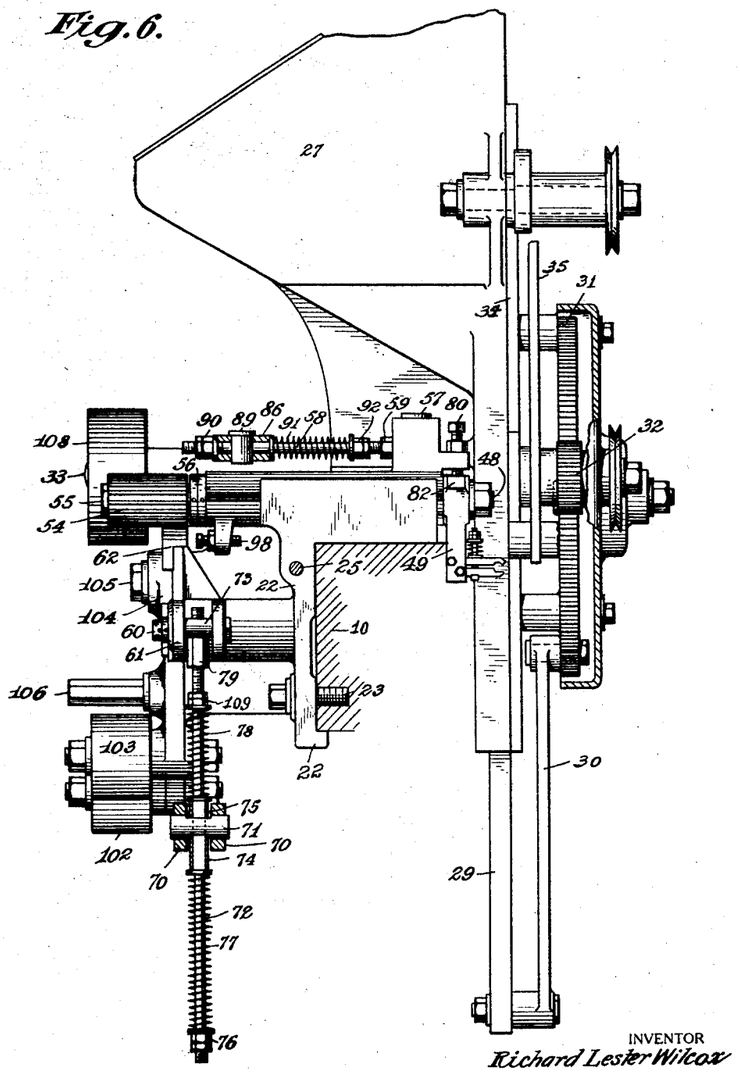
Figure 6 is an end view of the apron and associated parts, separated from the body of the machine.

The hopper mechanism and the major portion of the transfer mechanism in my improved device, are associated with the apron 22 that is adjustably secured to the body 10 by means of the bolts 23 that pass through slots 24 in the apron and are threaded into the body 10. A screw 25 is threaded into the apron and held against endwise movement by lugs 26 to facilitate the movement of this apron in both directions relatively to the body 10. The hopper mechanism is of a well known type and consists of a hopper 27 fixed to the extension 28 upon the apron 22, and in which is vertically movable a delivery slide 29 that is actuated through a link 30, one end of which is connected with a gear 31 that is rotated from a pinion 32 upon a shaft 33 rotatably mounted in the extension 28.

Figure 3:
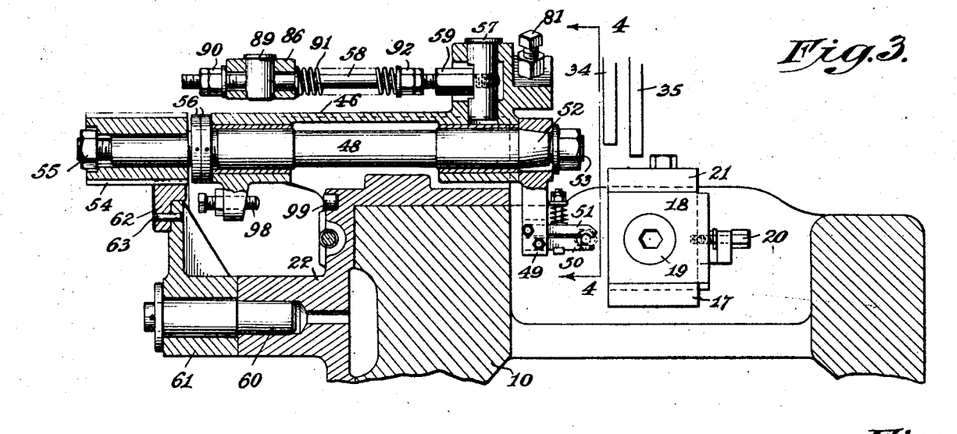
Figure 3 is an enlarged sectional elevation of the transfer carrier mechanism and adjacent parts, the section being taken generally upon line 3—3 of Figures 1 and 2.

Leading from this hopper 27 is a chute mechanism of the ordinary construction, having side plates 34 and 35 and cover plate 36, all of which are connected with the apron 22 by the bracket 37. Mounted within the apron 22 by the gib 47 is a slide 46, within which is journaled the spindle 48 having connected therewith at its inner end the finger holder 49, carrying the fingers 50 and 51. The finger holder 49 has a conical bore, into which projects the conical portion 52 of the spindle 48 and where it may be rigidly secured to said spindle in various positions about the axis thereof by the nut 53 without the risk of an accidental shifting of its relative position. The spindle 48 is held against axial movement within the slide 46 by the finger holder 49 at one end and the nut 56 threaded thereon. Fixed on the spindle 48 is the wide faced pinion 54, held against endwise movement by the nut 55. Loosely mounted in the slide 46 is the stud 57, into which is threaded the rod 58, which is held against relative movement therein by the nut 59.

Figure 4:
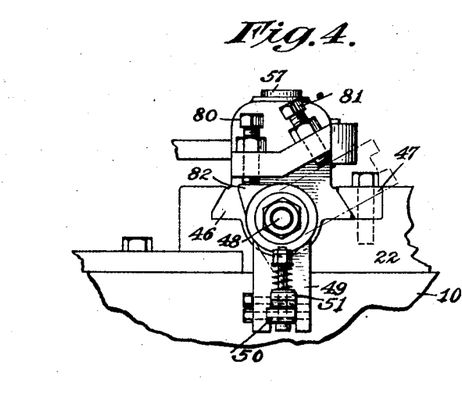
Figure 4 is an enlarged end elevation of a portion of the transfer mechanism and adjacent parts looking in the direction of the arrow in Figure 3.

Journaled upon a stud 60 fixed in the apron 22 is a rock arm 61, to the outer end of which is secured a segment 62 by rivets 63 or the like, the teeth of which mesh into those of the pinion 54. As shown, the segment and rock arm are two separate members but they may be made in a single piece if desired.

Rotatable on a stud 64 in the bracket 65 or the like, connected with the body 10, is the rock member 66, to the arm 67 of which is connected the cam roll 68 that projects into the cam recess 69 in the cam 41. At the outer end of the arm 70 on the rock member 66 is pivotally mounted a stud 71, through which projects a spring rod 72, which projects at one end through a stud 73 rotatable in the rock arm 61.

Surrounding the rod 72 upon opposite sides of the block 71 are the collars 74 and 75. Encircling the rod 72 between the collar 74 and nuts 76 is the spring 77 and between the nuts 109 and collar 75 is a spring 78. By means of these nuts 76 and 109 the relative position of the rock arm 61 and arm 70 may be varied, as well as the tension of the springs 77 and 78.

The rotation of the cam 41 imparts a rocking movement to the rock member 66 and through the rod 72 a similar movement to the rock arm 61. Thus through the intermeshing of the teeth of the segment 62 with those of the pinion 54 an oscillating movement is given to the spindle 48, thereby causing the fingers 50 to move through the arc of a circle, the extremes of which are limited by the stop screws 80 and 81.

When the finger holder 49 is in its substantially vertical position, as shown in Figure 4, the lug 82 thereon contacts with the stop screw 80 and when in the position shown by broken lines in the same figure, it contacts with the stop screw 81. These relative positions are varied, of course, by adjustment of the screws 80 and 81 in a well known manner.

As the movement from the cam 41 is transmitted through the rod 72 and spring connected therewith, if perchance there is any obstruction in the path of movement of the fingers 50, holder 49, or adjacent parts, either the spring 77 or spring 78 will yield, depending upon the direction of movement of the fingers 50, and the same will come to a full stop at the point where the obstruction is met, any further movement of the rock arm 66 being absorbed by either of these springs. The springs are adjusted through the nuts on the rod 72 so that under normal conditions rotary movement will be imparted to the spindle 48 and the springs will only yield when conditions are abnormal. These springs will also absorb a slight overthrow of the rock member 66 when the finger holder 49 engages either of the stop screws 80 and 81, thus insuring a definite and fixed position of the fingers at each end of their movement.

Figure 5:
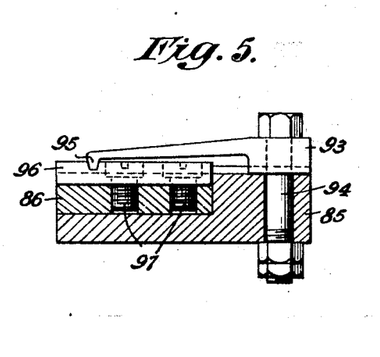
Figure 5 is an enlarged transverse sectional view of the lever mechanism, through which axial movement is imparted to the transfer fingers, the section being taken generally upon line 5—5 of Figure 2.

In the bracket 83, secured to the body 10, is a stud 84, upon which is pivotally mounted the levers 86 and 85, in the latter of which is a cam roll 87 that projects into the cam groove 88 in the cam 43. In the outer end of the lever 86 is a stud 89, through which projects the rod 58 (see Fig. 3). The position of the stud 89 relatively to the stud 57 is determined by the position of the nuts 90 threaded upon the outer end of the rod 58. This relative position under normal conditions is maintained by the spring 91. The levers 85 and 86 are connected by a slip joint, which comprises a latch 93 connected with the lever 85 by the bolt 94 and having a tooth 95 upon the outer end, which in one of its positions is seated in a recess in the plate 96, preferably hardened and secured to the lever 86 by one or more screws 97 or the like. When the latch is in the position shown in Figures 2 and 5 the levers 85 and 86 are a unit and are actuated upon their pivot mounting 84 from the cam 43, thus imparting axial movement to the spindle 48 within the slide 46 through the rod 58 and associated mechanisms. This spindle is in its extreme inward position when the axis of the blank, held between the fingers 50 and 51, is substantially coincident with the axis of the punch and die. This position being determined by the contact of the stop screw 98 in a lug upon the slide 46 with the plug 99 fixed in the apron 22, and any excess movement of the levers 85 and 86 at this point is absorbed by the spring 91.

If the fingers 50 or 51, or an associated part meets with an obstruction during the axial movement of the spindle 48 that is not absorbed by the spring 91, the tooth 95 of the latch 93 springs out of the recess in the plate 96, thus breaking the connection between the levers 85 and 86 and the lever 85 will continue its movement, being positively actuated through the cam 43, without imparting movement to the lever 86. Hence the spindle 48 receives no axial movement. Under these circumstances the spring 91 rocks the lever 86 upon its pivot mounting until the end thereof engages the stop 100 fixed in the body 10, and at the next movement of the lever 85, the tooth 95 again engages the recess in the plate 96 and the parts continue their operations as before, provided the obstruction has been removed, as is usually the case. If not, the connection between the two levers is broken, as before, and no movement is imparted to the lever 86 until the obstruction is removed.

The shaft 33 is rotated from the pulley 38 by the belt 101, which passes over the idler pulleys 102 and 103 rotatably mounted upon the arm 104 pivotally mounted upon a stud 105 fixed in the extension 28. This arm 104 is held in its adjusted position by the bolt 106 which passes through the segmental slot 107 in the arm and is threaded into the extension 28.

In operation the blanks or work pieces pass from the hopper down to the lower end of the chute and the lowermost blank in the column of blanks is grasped between the fingers 50 and 51 which yield to permit the same to pass thereover. The fingers then move in a path at substantially a right angle to the chute, withdraw the lowermost blank therefrom, and clear the blank from the chute mechanism. The fingers are then caused to move through a rotary path until the blank occupies a horizontal position with the axis thereof substantially parallel with that of the punch and die. The fingers then move in a straight path until the axis of the blank is in fact substantially coincident with that of the die and punch. When so positioned, the punch moves forward and encircles the shank of the blank and supports it. The fingers are now withdrawn in a straight path and afterwards return through a reverse circular path into position to grasp the next lowermost blank in the column of blanks in the chute, during which time the punch and dies co-operate to trim the blank. This movement of feeding and trimming blanks is entirely automatic, and as above indicated, the parts are so associated with each other as to eliminate all possibility of injury either to the blanks or the mechanism if perchance some parts should become disarranged or a blank misplaced.

The feed and transfer mechanisms always operate in a fixed relation to each other, that is, the position of the axis of the spindle 48 should always be in the same position relatively to the lower end of the feed chute, so that the transfer fingers may properly operate in connection therewith. However, it is equally obvious that the length of the blank, as well as the method of ejection of the blank from the die requires different positions thereof relatively to the dies and punch. This adjustment, therefore, is readily obtained in my device by shifting the position of the apron upon the body 10 through manipulation of the screw 25 and then shifting the cam 104 about its stud 105 so as to maintain the belt 101 taut with sufficient friction upon the pulley 108 to rotate the shaft 33. As the stud 57 is pivotally mounted in the slide 46 there is no adjustment required for the mechanism that imparts axial movement to the spindle 48 and as the stud 71 is pivotally mounted in the arm 70 a like condition exists with the mechanism for imparting a rotary movement to this spindle, all of these several parts accommodating themselves to the varying positions of the apron and its associated parts upon the bed 10.

Any change required in the timing of the transfer mechanism is accomplished by varying the relative position of the cams 41 and 43 about the axis of the crank shaft 11 by manipulation of the screws 45.

There are minor changes and alterations that may be made within my invention, aside from those herein suggested, and I would therefore have it understood that I do not limit myself to the exact construction herein shown and described, but claim all that falls fairly within the spirit and scope of the appended claims.

Having described my invention, what I claim as new and desire to secure by Letters Patent, is:

1. In mechanism of the character described wherein work pieces are successively presented to operating tools; a frame; a power shaft from which the operating tools are actuated; operating tools; mechanism for conveying the work pieces to a delivery station; means, actuated by the power shaft, for transferring the work pieces from such delivery station to the operating tools; and a member, upon which the said mechanism and transfer means are mounted, adjustable upon the frame relative to the power shaft, whereby work pieces of varying lengths may be presented to the operating tools, the transfer means automatically adjusting itself to the varying relative positions of the member and shaft.

2. In mechanism of the character described; a frame; a member movably mounted thereon; operating tools; chute mechanism for conveying work pieces to a delivery station where they are arranged at an angle to the operating tools; and means for transferring work pieces from the delivery station to the operating tools, the said chute mechanism and transfer means being mounted on said member.

3. In mechanism of the character described; a frame; a power shaft therein; operating tools; a hopper mechanism; a chute mechanism for conveying work pieces from the hopper mechanism to a delivery station; means for transferring work pieces from the delivery station to the operating tools; a member movably mounted on the frame and upon which are mounted the hopper mechanism, chute mechanism and transfer means; and means for actuating the transfer means from the power shaft irrespective of the relative position of said member.

4. In mechanism of the character described; a frame; a power shaft therein; operating tools; a hopper mechanism; a chute mechanism for conveying work pieces from the hopper mechanism to a delivery station; means for transferring work pieces from the delivery station to the operating tools; a member movably mounted on the frame and upon which are mounted the hopper mechanism, chute mechanism and transfer means; and means for actuating the transfer means and hopper mechanism from the power shaft irrespective of the relative position of said member.

5. In mechanism of the character described; a frame; a power shaft therein; operating tools, mounted in the frame; a hopper; chute mechanism for conveying work pieces to a delivery station from the hopper; automatic means for delivering work pieces successively and in order from the hopper to the chute mechanism; means for transferring the work pieces from the delivery station to the operating tools; a member slidable upon the frame and upon which are mounted the hopper, chute mechanism, the means for delivering the work pieces from the hopper to the chute mechanism, and the transfer means; means for adjustably securing the member to the frame, whereby work pieces of varying lengths may be presented to the operating tools; and means for actuating the transfer means and hopper mechanism from the power shaft.

6. In mechanism of the character described; a frame; a power shaft therein; operating tools mounted in the frame; a hopper; chute mechanism for conveying work pieces to a delivery station from the hopper; automatic means for delivering work pieces successively and in order from the hopper to the chute mechanism; means for transferring the work pieces from the delivery station to the operating tools; a member slidable upon the frame and upon which are mounted the hopper, chute mechanism, the means for delivering the work pieces from the hopper to the chute mechanism, and the transfer means; means for adjustably securing the member to the frame, whereby work pieces of varying lengths may be presented to the operating tools; and means for actuating the transfer means and hopper mechanism from the power shaft, the means for actuating said hopper mechanism being flexible.

7. In mechanism of the character described; a frame; a power shaft therein; operating tools mounted in the frame; a hopper; chute mechanism for conveying work pieces to a delivery station from the hopper, automatic means for delivering work pieces from the hopper to the chute mechanism; means for transferring work pieces from the delivery station to the operating tools; a member slidable upon the frame and upon which are mounted the hopper, chute mechanism, the means for delivering the work pieces from the hopper to the chute mechanism, and the transfer means; means for adjustably securing the member to the frame whereby work pieces of varying lengths may be presented to the operating tools; means for actuating the transfer means from the power shaft; flexible means for actuating the hopper automatic means from the power shaft; and means for maintaining the said flexible means taut in the varying relative positions of the member on the frame.

8. In mechanism of the character described; a frame; a power shaft therein; operating tools mounted in the frame; a hopper; chute mechanism for conveying work pieces to a delivery station from the hopper; automatic means for delivering work pieces from the hopper to the chute mechanism; means for transferring work pieces from the delivery station to the operating tools; a member slidable upon the frame, and upon which are mounted the hopper, chute mechanism, the means for delivering the work pieces from the hopper to the chute mechanism, and transfer means; means for adjustably securing the member to the frame whereby work pieces of varying lengths may be presented to the operating tools; means for actuating the transfer means from the power shaft; flexible means for actuating the hopper automatic means from the power shaft; and means for maintaining the said flexible means taut in the varying relative positions of the member on the frame, and comprising in part a rock member pivotally mounted and adjustably secured to the member.

9. In mechanism of the character described wherein work pieces are successively presented to operating tools; a frame; a power shaft therein and from which the operating tools are actuated; mechanism for conveying the work pieces to a delivery station during which transfer the work pieces travel in a circular and a straight path; means for stopping the movement of said work pieces if the same or parts for holding the same meet an obstruction; and a member upon which the said chute mechanism and transfer means are mounted, adjustable upon the frame relative to the operating tools, whereby work pieces of varying lengths may be presented to the operating tools under normal conditions.

10. In mechanism of the character described wherein work pieces are successively presented to operating tools; a frame; a power shaft therein and from which the operating tools are actuated; mechanism for conveying the work pieces to a delivery station during which transfer the work pieces travel in a circular and a straight path; means for stopping the movement of said work pieces if the same or parts for holding the same meet an obstruction; and a member upon which the said chute mechanism and transfer means are mounted, adjustable upon the frame relative to the operating tools, whereby work pieces of varying lengths may be presented to the operating tools under normal conditions, the arrangement of such transfer mechanism being such that if the same is stopped by reason of an obstruction as aforesaid the same will continue its movement in timed relation with the associated parts when such obstruction is removed.

11. In mechanism of the character described wherein work pieces are successively presented to operating tools; a frame; chute mechanism for conveying work pieces to a delivery station; means for transferring work pieces from the delivery station to the operating tools which move the work pieces in a circular and a straight path, comprising in part a pivotally mounted element, a spring thereon and lever means movable upon an axis having a fixed relation with the operating tools, connected with the pivoted member and having contact with the spring; and a member upon which said mechanism, with the exception of the operating tools, is mounted, adjustable upon the frame relative to the operating tools, whereby work pieces of varying lengths may be presented to the operating tools, the transfer means automatically adjusting itself to the varying relative positions of the members and operating tools.

12. In mechanism of the character described wherein work pieces are successively presented to operating tools; a frame; a power shaft therein and from which the operating tools are actuated, operating tools; mechanism for conveying the work pieces to a delivery station; means for transferring the work pieces from such delivery station to the operating tools, comprising in part lever means actuated from said shaft and pivotally connected with the frame, and a yielding connection between the lever means and the other parts of said transfer means; and a member upon which the said mechanism and transfer means are mounted adjustable upon the frame relative to the power shaft, whereby work pieces of varying lengths may be presented to the operating tools.

13. In mechanism of the character described wherein work pieces are successively presented to operating tools; a frame; a power shaft therein; operating tools mounted in the frame; lever mechanism connected with the frame; a member independent of the operating tools separably connected with the frame and adjustable relatively to the operating tools, whereby means are provided for presenting work pieces of varying lengths to the operating tools; chute mechanism for delivering work pieces to a delivery station on said member; means for transferring blanks from the delivery station to the operating tools, comprising in part a slide movably mounted in said member; and a connection between the slide and lever mechanism that will automatically adjust itself to accommodate varying positions of the member relatively to the frame.

14. In mechanism of the character described; a frame; a power shaft therein; operating tools mounted in the frame; companion levers pivotally connected with the frame and actuated from the power shaft; a separable connection between the levers, whereby one lever may move independently of the other; a member independent of the operating tools, having a work piece delivery station thereon connected with, and adjustable relatively to the frame; means for delivering a work piece to the operating tools from the delivery station, comprising in part a slide movable in the member; and an operative connection between one of the companion levers and the slide which will adjust itself to the varying relative positions of the slide due to the adjustment of the members.

15. In mechanism of the character described; a frame; a power shaft therein; operating tools mounted in the frame; companion levers pivotally connected with the frame and actuated from the power shaft; a separable connection between the levers, whereby one lever may move independently of the other; a member independent of the operating tools, having a work piece delivery station thereon adjustably connected with the frame; means for delivering a work piece to the operating tools from the delivery station, comprising in part a slide movable in the member; an operative connection between one of the companion levers and the slide which will adjust itself to the varying relative positions of the slide due to the adjustment of the members, comprising an element pivotally connected with the slide and one of the companion levers, and a spring between the latter lever and a fixed part on the slide, whereby the slide will be actuated positively in one direction by the lever and in the opposite direction by yielding means through the same lever.

16. In mechanism of the character described; a frame; a power shaft therein; operating tools mounted in the frame; companion levers pivotally connected with the frame and actuated from the power shaft; a separable connection between the levers, whereby one lever may move independently of the other, comprising a member fixed to one of the levers and having a spring engagement with the other lever; a member independent of the operating tools, having a work piece delivery station thereon, adjustably connected with the frame; means for delivering a work piece to the operating tools from the delivery station, comprising in part a slide movable in the member; an operative connection between one of the companion levers and the slide which will adjust itself to the varying relative positions of the slide due to the adjustment of the members, comprising an element pivotally connected with the slide and one of the companion levers and a spring between the latter lever and a fixed part connected on the slide, whereby the slide will be actuated positively in one direction by the lever and in the opposite direction by yielding means through the same lever.

17. In a mechanism of the character described; a frame; a power shaft therein; operating tools mounted in the frame; companion levers pivotally connected with the frame and actuated from the power shaft; a separable connection between the levers, whereby one lever may move independently of the other, comprising a member fixed to one of the levers and having a spring engagement with the other lever; a member independent of the operating tools having a work piece delivery station thereon adjustably connected with the frame; means for delivering a work piece to the operating tools from the delivery station, comprising in part a slide movable in the member; an operative connection between one of the companion levers and the slide which will adjust itself to the varying relative positions of the slide due to the adjustment of the member, comprising an element pivotally connected with the slide and one of the companion levers, and a spring between the latter lever and a part on the slide, whereby the slide will be actuated positively in one direction by the lever and in the opposite direction by yielding means through the same lever.

18. In mechanism of the character described; a frame; a power shaft therein; operating tools mounted in the frame; companion levers pivotally connected with the frame and actuated from the power shaft; a separable connection between the levers, whereby one lever may move independently of the other, comprising a latch connected with one of the levers and having a spring tooth connection with the other lever; a member independent of the operating tools, having a work piece delivery station thereon adjustably connected with the frame; means for delivering a work piece to the operating tools from the delivery station, comprising in part a slide movable in the member; an operative connection between one of the companion levers and the slide which will adjust itself to the varying relative positions of the slide due to the adjustment of the member, comprising an element pivotally connected with the slide and one of the companion levers, and a spring between this latter lever and a part on the slide, whereby the slide will be actuated positively in one direction by the rigid lever and in the opposite direction by yielding means through the same lever.

19. In mechanism of the character described; a frame; a power shaft therein; operating tools mounted in the frame; companion levers pivotally connected with the frame and actuated from the power shaft; a separable connection between the levers, whereby one lever may move independently of the other, comprising a latch connected with one of the levers and having a spring tooth connection with the other lever; a member independent of the operating tools, having a work piece delivery station thereon adjustably connected with the frame; means for delivering a work piece to the operating tools from the delivery station, comprising in part a slide movable in the member; an operative connection between one of the companion levers and the slide, which will adjust itself to the varying relative positions of the slide due to the adjustment of the member, comprising an element pivotally connected with the slide and one of the companion levers, and a spring between the latter lever and a part on the slide, whereby the slide will be actuated positively in one direction by the rigid lever and in the opposite direction by yielding means through the same lever; and a stop in the path of one of the levers which holds it against movement in one direction during the movement of the the other lever and whereby the levers may be realigned relatively to each other.

20. In mechanism of the character described; operating tools; chute mechanism for conveying blanks to a delivery station; means for transferring work pieces from the delivery station to the operating tools, which in part move the work pieces in a circular path; a member independent of the operating tools upon which the chute mechanism and transfer means are mounted adjustable upon the frame to accommodate work pieces of varying lengths; a sector movably connected with the member and forming part of the transfer means; mechanism having a fixed relation to the operating tools for actuating the sector; and an operative connection between such mechanism and the sector.

21. In mechanism of the character described; a frame; a power shaft therein; operating tools mounted in the frame and actuated from the power shaft; a member independent of the operating tools and adjustably secured upon the frame, whereby work pieces of varying lengths may be presented to the operating tools; transfer means for moving a work piece in a circular path from the delivery station on the member toward the operating tools; and means for imparting rotary movement to the transfer means from the power shaft irrespective of the relative position of the member and frame, the transfer means automatically adjusting itself to the varying relative positions of the member on the frame.

22. In mechanism of the character described; a frame; a power shaft therein; operating tools mounted in the frame and actuated from the power shaft; a member independent of the operating tools and adjustably secured upon the frame, whereby work pieces of varying lengths may be presented to the operating tools; transfer means for moving a work piece in a circular path from a delivery station on the member toward the operating tools; means for imparting rotary movement to the transfer means from the power shaft irrespective of the relative position of the member and frame, comprising in part a rock member connected with the frame actuated from the power shaft; and a hinged connection between the rock member and the transfer means.

23. In mechanism of the character described; a frame; a power shaft therein; operating tools mounted in the frame and actuated from the power shaft; a member independent of the operating tools and adjustably secured upon the frame, whereby work pieces of varying lengths may be presented to the operating tools; transfer means for moving a work piece in a circular path from a delivery station on the member toward the operating tools; means for imparting rotary movement to the transfer means from the power shaft irrespective of the relative position of the member and frame, comprising in part a rock member connected with the frame, actuated from the power shaft; a sector having a geared connection with the transfer means and pivotally connected with the member; a rigid connection between the rock member and sector; and a yielding member between the rock member and sector through which motion is imparted to the sector irrespective of the relative position of the member and power shaft.

24. In mechanism of the character described; a frame; a power shaft therein; operating tools in the frame; a member independent of the operating tools and adjustably secured upon the frame; transfer means for moving a blank in a circular path from a delivery station on the member toward the operating tools; means for imparting rotary movement to the transfer means from the power shaft, comprising in part a rock member connected with the frame, a sector having a geared connection with the transfer means and pivotally connected with the member, a rigid connection between the rock member and sector having both a pivotal and a sliding engagement with the rock member; and a yielding member between the rock member and sector that exerts a constant pressure upon the latter.

25. In mechanism of the character described; a frame; a power shaft therein; operating tools mounted in the frame; transfer means for delivering a blank to the operating tools; and means for imparting movement to the transfer means from the power shaft, comprising a sector, a rock member on the frame, and a swivel member journaled in the rock member; a rod pivotally connected at one end of the sector and passing through the swivel member at substantially a right angle to the axis thereof; and springs surrounding the rod upon opposite sides of the swivel member and exerting a tension thereon.

26. In mechanism of the character described; wherein work pieces are successively presented to operating tools; a power shaft from which the operating tools are actuated; operating tools; mechanism for conveying the work pieces to a delivery station; means, actuated by the power shaft, for transferring the work pieces from such delivery station to the operating tools; a member upon which the said mechanism and transfer means are mounted upon the frame, adjustable relative to the power shaft, whereby work pieces of varying lengths may be presented to the operating tools, the transfer means automatically adjusting itself to the varying relative positions of the member and shaft; and means connected with the power shaft for varying the timed relation of the movement of the transfer mechanism relating to the operating tools.

27. In mechanism of the character described, wherein work pieces are successively presented to operating tools; a power shaft from which the operating tools are actuated; operating tools; mechanism for conveying the work pieces to a delivery station; means, actuated by the power shaft, for transferring the work pieces from such delivery station to the operating tools; a member, upon which the said mechanism and transfer means are mounted, adjustable upon the frame relative to the power shaft, whereby work pieces of varying lengths may be presented to the operating tools, the transfer means automatically adjusting itself to the varying relative positions of the member and shaft; means connected with the power shaft for varying the timed relation of the movement of the transfer mechanism relatively to the operating tools, comprising a member fixed to the power shaft; companion cams; and means for separably and adjustably securing the cams to the last mentioned member.

28. In mechanism of the character described; a frame; a power shaft therein; operating tools mounted in the frame; a member independent of the operating tools and adjustably secured upon the frame; transfer means for moving a blank in a circular path from a delivery station on the member toward the operating tools; and means for imparting rotary movement to the transfer means from the power shaft, comprising in part a rock member connected with the frame, a sector having a geared connection with the transfer means and pivotally connected with the member, a rigid connection having a pivotal engagement with the rock member and companion yielding members, one upon each side of the point of pivotal engagement of the said rigid connection with the rock member.

In testimony whereof, I have hereunto affixed my signature.

RICHARD LESTER WILCOX.